United States Patent
Sinclair et al.

(10) Patent No.: US 7,049,272 B2
(45) Date of Patent: May 23, 2006

(54) DOWNHOLE CHEMICAL DELIVERY SYSTEM FOR OIL AND GAS WELLS

(75) Inventors: A. Richard Sinclair, Houston, TX (US); S. Byron Smith, Houston, TX (US)

(73) Assignee: Santrol, Inc., Fresno, TX (US)

( * ) Notice: Subject to any disclaimer, the term of this patent is extended or adjusted under 35 U.S.C. 154(b) by 311 days.

(21) Appl. No.: 10/195,989

(22) Filed: Jul. 16, 2002

(65) Prior Publication Data

US 2004/0014607 A1 Jan. 22, 2004

(51) Int. Cl.
*C09K 8/00* (2006.01)

(52) U.S. Cl. .............. 507/230; 507/124; 507/902; 166/376; 166/377; 166/305.1

(58) Field of Classification Search ........ 507/902, 507/124, 230; 166/376, 377, 305.1, 205, 166/227
See application file for complete search history.

(56) References Cited

U.S. PATENT DOCUMENTS

| | | | | | |
|---|---|---|---|---|---|
| 2,748,867 | A | * | 6/1956 | Lissant ................. | 166/309 |
| 3,305,109 | A | * | 2/1967 | Kerr .................... | 414/210 |
| 3,402,137 | A | * | 9/1968 | Fischer et al. ......... | 524/321 |
| 4,369,281 | A | * | 1/1983 | Zimmermann et al. ..... | 524/379 |
| 4,481,326 | A | * | 11/1984 | Sonenstein ............ | 524/377 |
| 4,692,494 | A | * | 9/1987 | Sonenstein ............ | 525/57 |
| 5,102,950 | A | * | 4/1992 | Terada et al. ......... | 525/60 |
| 5,316,688 | A | * | 5/1994 | Gladfelter et al. ..... | 510/224 |
| 5,758,725 | A | * | 6/1998 | Streetman ............. | 166/304 |
| 5,948,848 | A | | 9/1999 | Giltsoff .............. | 524/503 |
| 5,955,144 | A | | 9/1999 | Sinclair et al. ....... | 427/214 |
| 6,380,136 | B1 | * | 4/2002 | Bates et al. .......... | 507/90 |
| 6,387,986 | B1 | * | 5/2002 | Moradi-Araghi et al. .. | 523/211 |
| 6,605,570 | B1 | * | 8/2003 | Miller et al. ......... | 507/211 |
| 6,605,582 | B1 | * | 8/2003 | Schramm, Jr. et al. .. | 510/296 |
| 6,702,044 | B1 | * | 3/2004 | Reddy et al. .......... | 175/64 |
| 6,723,683 | B1 | * | 4/2004 | Crossman et al. ....... | 507/111 |
| 6,840,318 | B1 | * | 1/2005 | Lee et al. ............ | 166/293 |
| 2003/0234103 | A1 | * | 12/2003 | Lee et al. ............ | 166/293 |
| 2004/0043906 | A1 | * | 3/2004 | Heath et al. .......... | 507/200 |

FOREIGN PATENT DOCUMENTS

WO  92/01556  2/1992

* cited by examiner

Primary Examiner—Philip C. Tucker
(74) Attorney, Agent, or Firm—Howrey LLP

(57) ABSTRACT

The invention provides a method of treating of a well, a formation, or both, with the solids, liquids, or apparatuses, by 1) encasing said solids, liquids, or apparatuses in a water-soluble shell, 2) conveying said encased solids, liquids, or apparatuses to a predetermined location in the well, and then 3) allowing the water-soluble shell to dissolve in the aqueous phase in the wellbore. The shell is preferably made of water-soluble polyvinyl alcohol copolymers and a waterproofing agent. The shell encases a variety of solids, liquids, or combinations thereof, where said solids or liquids are useful in the treatment of the well or of the producing formation. Illustrative encased material includes soap, acid, corrosion inhibitors, chelating agents, scale inhibitors, mutual solvents, paraffin inhibitors, paraffin dissolvers, clay stabilizers, and tracer materials. The encased materials may also be apparatuses, such as a prefabricated screen completion or a prefabricated sand-pack. The tool used to deliver the apparatuses may also be made from a water-soluble polyvinyl alcohol copolymer.

45 Claims, 2 Drawing Sheets

DOWNHOLE CHEMICAL DELIVERY SYSTEM FOR OIL AND GAS WELLS

FIELD OF THE INVENTION

The invention relates generally to a dissolvable encapsulating material, and to its use to convey materials, chemicals, and other devices down a wellbore.

BACKGROUND OF THE INVENTION

In the oils and gas industry there are producing wells which range from several hundred feet to over 20,000 feet in depth. These wells are narrow, often less than six inches in diameter. In addition, these wells typically have smaller diameter tubes suspended therein. It is often necessary to place chemicals or other apparatus at or near the bottom of the wellbore.

In the case of fluids, the current methods of placing chemicals near or at the bottom of a wellbore are to either push a plug of the fluid down the well, displacing fluid in the wellbore, or to suspend a small diameter tube, often called a coiled tube, down the well, and push the fluid down this coiled tube. Both methods have substantial drawbacks. The chemical may absorb or react with components in the wellbore during transit. Additionally, a substantial quantity of fluid and material suspended therein that was in the wellbore is displaced into the producing formation. In many cases this is not desirable. The use of coiled tubing solves many of these problems, but the cost and risk of hanging a small diameter tube into a wellbore is substantial. Also, corrosive attack of this coiled tubing from injected chemicals is often particularly severe, as the pipe walls tend to be thin compared to the well tubulars.

In the case of solids, solids are often displaced as a slurry into the bottom of the well. Accordingly, many of the problems associated with injecting fluids are present.

There is one method where a particular chemical is coated and then is either placed, allowed to fall, or displaced to a predetermined location in the well. This is soap, used to help foam a well and thereby increase the effect of gas lift. The prior art method of insulating the soap solids during transit down a well is to encase the soap in wax. The encased soap is then put downhole, where wax dissolves as the temperature increases.

In certain wells, particularly deep and hot wells, wax encasement is not particularly useful. For example, it is often desirable to place a foaming soap at the bottom of a deep well. The chemicals take longer to place than for a shallower well. The prior art soap-sticks encased in wax had the obvious shortcoming that waxes often melted prematurely, especially in deep wells where prior production had heated the wellbore. Wells generally follow the geothermal gradient, with hot temperatures downhole and cooler near-ambient temperatures near the ground surface. As a rule, the deeper the well, the hotter the bottomhole temperature.

The presence of hot oil and other chemicals, including encapsulated chemicals, may accelerate the dissolution. Furthermore, as the temperature increases, some temperature-activated or temperature-sensitive chemicals exposed by the degradation of the wax to fluids in the wellbore may react prematurely.

Occasionally, especially when fluids had been circulated to the bottom of the wellbore or displaced into the producing formation, thereby cooling the wellbore, waxes do not melt sufficiently fast to provide chemical needed for a start-up. Wax has the additional problem of lacking mechanical strength, especially as the temperature warmed, and wax might easily be abraded off an encased apparatus.

Larger apparatuses, such as resin coated screen and the like, are often difficult to place because the apparatus is easily damaged during transit down a wellbore. Protective material is not often utilized, because such material eventually becomes problematic trash in the wellbore. Wax provides inadequate protection for such apparatuses.

Many times a Frac Pack or Sand Control Treatment is needed to keep a well from producing back formation fines that can eventually plug or choke off the flow of oil or gas. Normal liners and screens cause the well's production to be reduced since screens become plugged or flow restricted. To solve this problem, a screenless completion can be used where resin coated particles are pumped into the wellbore an adjacent formation. this works well with small intervals, but not as well with longer intervals.

The last few years have witnessed a drastic increase in research on encapsulated products and methods to produce such products. This is particularly so in the pharmaceutical field. And it is now becoming recognized that encapsulation technology may be useful in many other fields.

Encapsulation techniques are now used in the oil industry. The uses range from coating magnetic particles with plastic to providing cement accelerators during a well cementing process. Collagen and dissolvable containers may also provide a means for transporting chemicals down a well. The problems with the existing technology are that some of the containers leave a residue which can damage the formation. Others are difficult to mold and lack the strength to withstand the pressures in deep wells.

What is needed is a quick curing molded coating that provides mechanical strength and that can insulate solids, liquids, and even gases during transit down a wellbore, but does not decompose prematurely, and does not leave residue.

SUMMARY OF THE INVENTION

The invention is the use of a dissolvable shell composition encasing a material or apparatus, that provides mechanical strength sufficient to protect the encased material during transit down wellbores, including deep and hot wells The shell is comprised of a water-soluble polyvinyl alcohol (PVA) co-polymer. Additionally, a waterproofing agent such as a phenoxy resin or a wax may be added. Optionally, a plasticizer may be included. The plasticizer may be glycerol, glycerine or soya bean oil. Additionally, a stabilizer may also be included. The stabilizer may comprise stearamide or stearate.

The shell encases a variety of solids, liquids, or combinations thereof, where said solids or liquids are useful in the treatment of the well or of the producing formation. For illustration rather than limitation, the encased material can be soap, acid, corrosion inhibitors, chelating agents, scale inhibitors, mutual solvents, paraffin inhibitors, paraffin dissolvers, clay stabilizers, tracer materials, or other materials useful in the treatment of the well or formation. The encased materials may also be apparatuses, such as a prefabricated screen completion or a prefabricated sand-pack.

The invention is also the method of treating of a well, a formation, or both, with the solids, liquids, or apparatuses, by 1) encasing said solids, liquids, or apparatuses in a dissolvable shell, 2) conveying said encased solids, liquids, or gases to the predetermined location in the well, and then 3) allowing the shell composition to dissolve or decompose in the aqueous phase in the wellbore.

DETAILED DESCRIPTION OF THE INVENTION

Figure 1:
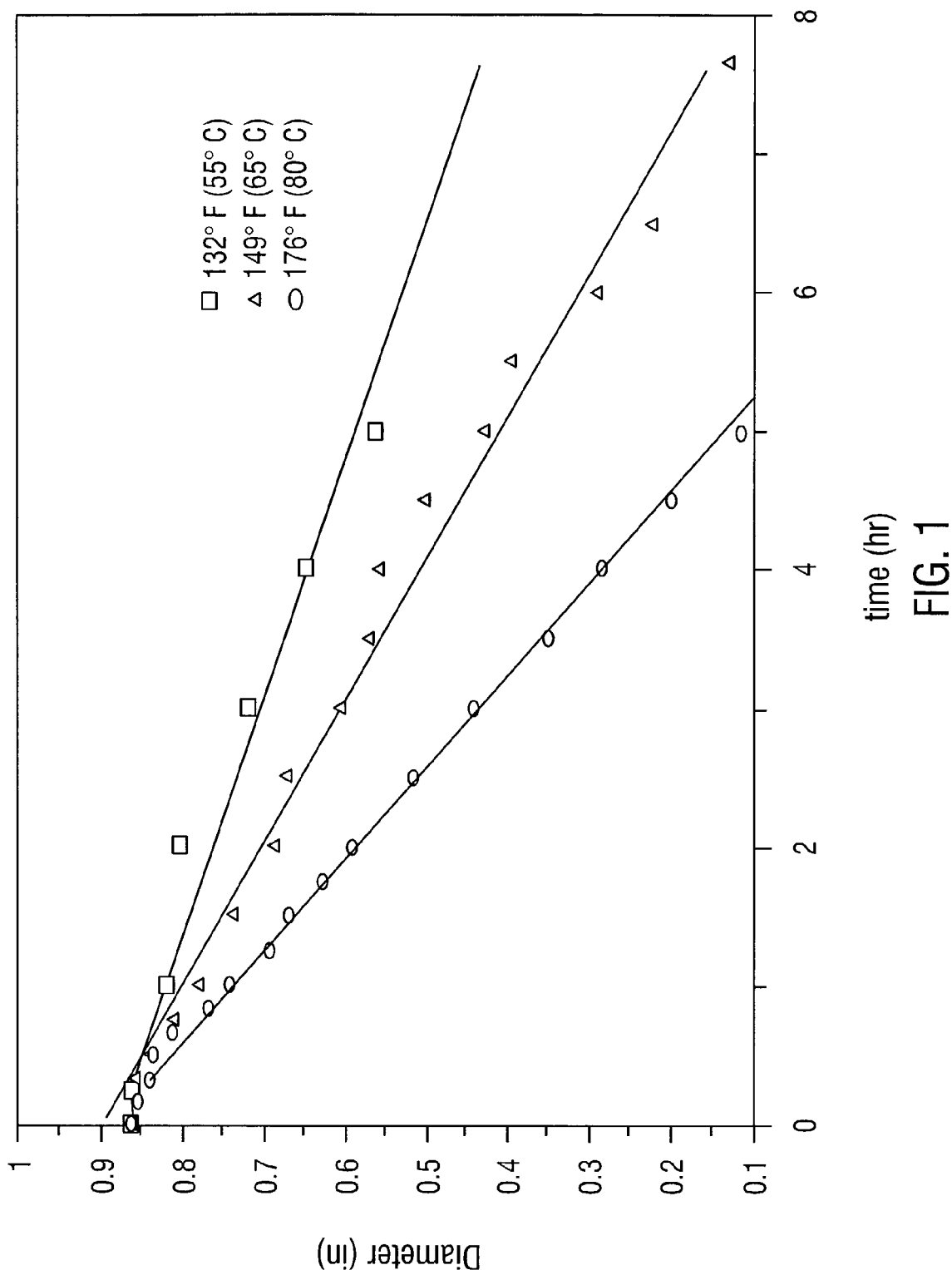
FIG. 1 is a graph of the diameter of solid polyvinyl alcohol copolymer spheres over time at various temperatures per Example 1.

The invention is shell compositions that provide mechanical strength and that can insulate solids and liquids during transit down a wellbore. As used herein, the terms "shell" and "casing" are used interchangeably, and refer to the water-soluble material that provides insulation from wellbore fluids, mechanical strength, or both during transit down a wellbore. It is preferred that once dissolved the shell does not leave substantial residue. The invention is also the various materials and/or apparatuses encased in protective shells for use in wellbores. The invention is also a method of treating wells and formations using the materials transported downhole using protective shells.

The shell must substantially encase the materials or apparatuses to be conveyed downhole. By substantially encase it is meant the materials should be conveyed to the proper depth before being exposed to wellbore fluids. It is recognized, however, that small losses are not important in well treatment, where it is customary to use 20% to 100% excess for any chemical treatment as insurance. The degree of isolation the shell must provide from the wellbore environment depends on the cost of the material, the phase, that is, liquid or solid, and the speed with which the wellbore and fluids therein fluids may react with and render treating chemicals ineffective. For example, it is generally necessary to almost completely encase chemicals such as soap, that is, greater than about 90%, preferably greater than 98%, more preferably 100%, of the surface of the soap is initially covered and isolated from wellbore fluids by the shell. For liquids, including liquid surfactants, corrosion inhibitors, and the like, the shell must isolate the treatment liquid from the wellbore liquid so that at least about 70%, preferably 100%, of the treating liquid remains in the shell when the shell arrives at the desired depth. For solids, the required shell characteristics vary considerably. It is within the skill of one in the art, given the benefit of this disclosure, to design shell configurations to convey and to distribute the treating materials and apparatuses at the desired depth in a well where they will be most effective. For inert materials, such as a pre-made sand-control pack downhole tools or screen, the shell need only encase or contact the apparatus sufficiently to support and maintain the apparatus integrity during transit down a wellbore. In the case of a coated tubing, the tubing can be easily retrieved after the coating is dissolved. For soluble solids, the shell must isolate the solids from wellbore fluids so that an acceptable amount of the solids remain when the encased material reaches the desired depth.

The shell must be able to withstand the temperatures and the hostile environment of the wellbore for a pre-selected amount of time, so that the encased material can be placed in its desired location before the shell integrity is compromised. This will be a function of shell composition, shell thickness, and shell configuration.

The shell, however, must eventually dissolve or decompose in the well fluid. By "water-soluble" it is meant that over a time period varying from about 0.5 hours to about 2 weeks, preferably less than 2 days, essentially all of the polymer or compound will be dis-aggregated and carried away by the water flux in a wellbore. The casing material need not form a solution when it dissolves in the aqueous phase, provided it dis-aggregates into sufficiently small particles, i.e., a colloid, that can be removed by the liquid flux in the well.

It is recognized that some shells may be comprised of compositions that vary with depth. This may be the case when, for example, an outer portion contains more of, or a different copolymer than the inner portion. The inner portion, or the outer portion, may therefore have different properties, for example, be more resistant to degradation or to diffusion of the encased material. Such a shell may be useful for example, the timed release of chemical into a flux of fluids in the wellbore.

It is important that the shell does not degrade prematurely, and does not leave substantial residue. It is recognized that small fragments of a shell may be carried out of the well by the flux of fluids, without dissolving in the traditional sense. To obtain this objective, multilayers of different materials may be incorporated to allow for both solubility and temperature to cause dissolution of the said materials. An optional stabilizer may be added to the outer shell, for example, to give it greater abrasion resistance. The inner shell may use a wax or plasticizer to protect the shell from dissolution and to improve the shelf storage life.

Other compounds may be added to modify the shell properties. For example, adding refined oil will decrease the hydrophilic character of the shell, thereby making it more inert to the brine in the wellbore. Glycerin and the like help stabilize shells during the curing process, but do not substantially lengthen the dissolution time to the extent oils do. Polymers, fibers, and filaments may be added to increase strength or otherwise modify the shell properties. Although not soluble, they can be easily washed from the wellbore by the normally available water flux that is found in the well.

Fabrication techniques for the containers may include any of the standard methods used in forming plastic items. Examples are injection molding, blow molding, and cast extrusion. Downhole carriers may be made in a variety of shapes including a substantially cylindrical or substantially spherical shape. Present day extrusion molding machines can be used to make these carrier shells. For example, in the case of a sphere, two hollow halves of the sphere can be formed and filled with usable chemicals before or after joining the halves together. Once the hollow shell is filled it can be sealed in several ways. One method is to use a drilled hole to load the carrier and then use a plastic plug to seal in the chemical or chemicals being carried. Another method is to use a one way valve to load a liquid chemical into the sphere. The cylinder may be made by extrusion into a hollow pipe and sealed by threaded or other type of end plugs so that the chemical may be loaded and sealed in the cylinder for normal storage and handling.

In molding, the temperature can range from subambient, i.e., about 60° F., to about 400° F. The optimum curing time and conditions depends on the combination of polymers, substitution copolymers, and crosslinkers selected. Curing temperatures between about 80° F. and 400° F. are generally preferred from an operational standpoint.

The preferred shell compositions are comprised of water-soluble PVA copolymers, and a waterproofing agent, preferably wax. Blends of one or more substituted copolymers, paints, stabilizers or plasticizers can also be employed.

Methods of preparing PVA copolymer plastics are described in U.S. Pat. No. 5,948,848, the entire disclosure of which is incorporated herein by reference. Briefly, polyvinyl alcohol is synthesized by the polymerization of vinyl acetate under basic conditions to form polyvinyl acetate. This is followed by the hydrolysis of ester groups in polyvinyl acetate in either acidic or alkaline mediums. The degree of hydrolysis determines the rate and extent of solubility of polyvinyl alcohol in water. As the degree of hydrolysis increases, the solubility at a particular temperature decreases.

If desired, additives such as stabilizers or plasticizers may be added to the polyvinyl alcohol prior to extrusion or moulding. The additives make to polyvinyl alcohol more pliable and easier to extrude. If a waterproofing agent is desired, the extruded or moulded article is dipped or coated with the waterproofing material.

The shell is in contact with the substrate material or apparatus. The shell is of any effective thickness, typically from about 1 to about 25 millimeters, although the thickness can be outside of these ranges. The shell must be structurally strong and thus thick enough to resist substantial physical and mechanical forces without breaking.

In one embodiment of the invention soap, that is, a surfactant, is encased in a shell that is about one eighth of an inch thick. The soap can be either rectangular, cylindrical, spherical, or any other shape that allows passage down a well. The soap diameter can be between about 1 inch and about 3 inches in diameter. The thickness is not important, except the size must be such that the soap fits through tubulars in the well. The soap is put into the well and can be displaced down the well with injected fluid, or allowed to freefall through the fluid. The encased soap reaches the bottom of the well before the shell has dissolved to the extent that the soap is exposed. Once the shell dissolves, the soap dissolves in the water. This soap later assists in starting the well by foaming, or helps production by facilitating lifting of fluids in the well by gasification.

Other chemicals that can be usefully encased include lime, scale inhibitors, asphaltene inhibitors or dispersants, gels, acids, pH adjusters and buffers, chelants, and the like. A class of chemicals that is especially well suited for encasement are corrosion inhibitors. Such inhibitors are needed from the perforations up. In some applications, a wax-corrosion inhibitor solid is manufactured and put downhole. The encasement allows more effective liquid inhibitors to be used, and eases the handling and placement problems. In addition, inhibitors encased in water-soluble shells can be used even in cool wells where wax may not be appropriate, as lower melting point waxes have substantial handling, storage, and shipping problems.

For those chemicals that may themselves dissolve the casing, such as acids, it is often advantageous to have a water-resistant layer, such as wax, a hydrocarbon, or a polymer gel that prevents the chemical from prematurely attacking the shell.

If wax is used on the interior of the shell to isolate a reactive encased material from the shell of this invention, the wax will protect the shell during manufacture and transport of the encased material. The wax will be selected so that it melts at a temperature below that temperature of the well at which the encased material is intended to be released. Petroleum derived paraffinic waxes having a melting point between about 100° F. and about 450° F. are preferred.

In another embodiment of this invention, the shell itself is coated with a multilayer encapsulation where more than one soluble shell material and/or thermally sensitive material, i.e., wax, is used in discrete layers. Discrete layers of wax and water-soluble material is one preferred embodiment. The wax prevents water from attacking and dissolving the shell until the wax dissolves away in the high temperature environment downhole. Wax may also facilitate handling when there is concern that the encased material may diffuse through the shell or cause problems by leaking during storage.

The exterior shell of the container may be coated with a priming oil-based paint or pigmented shellac. This exterior paint coating will add additional water proofing and storage life to the shell and may be worn away by the abrasive nature of the walls of the wellbore. Scratches in this coating on the journey down the wellbore expose the soluble material and allow dissolution to start.

Another material that can be encased in a water-soluble shell is scale inhibitor. The scale inhibitor can be fluid or solid, and can be dispersed throughout the shell, encased in one continuous mass inside the shell, or encased in a plurality of small, that is, less than about 0.5 inches, preferably less than 0.25 inches in diameter, cavities within the shell. In one embodiment, the shell may be very inert, including combinations of cross-linkable compounds, cross-linkers, and additives such that the dissolution of the shell in water and the subsequent release of scale inhibitor is very slow.

The present invention relates to a method for treating wells and subterranean formations and in one of its aspects relates to a method for treating a subterranean (e.g. hydrocarbon-bearing) formation to alter the flow profile through the formation by injecting a solution of ungelled gelatin into the more permeable zones of the formation and then allowing the gelatin to gel to thereby block or restrict flow through the more permeable zones. The gel is encased in a shell and transported therein to the bottom of the well.

It is necessary to select a shell casing for the specific range of temperatures which will be encountered when practicing the invention in a wellbore. A hydrocarbon formation along the Gulf Coast may have a formation temperature of over 250° F. This assumes a temperature gradient of 1.1° F. per hundred feet of well depth. The degree of hydrolysis of the polyvinyl acetate will determine how easily the shell dissolves at a particular temperature. The higher the degree of hydrolysis, the lower the solubility at a particular temperature.

The reaction-preventive shell casing must be substantially chemically inert to the encapsulated material and to the external medium around it, at the temperatures encountered, for a specific amount of time needed to place the encased material. The shell casing should be resistant to diffusion in either direction, resistant to breakage from mechanical forces, and generally stable through temperature variations. Additionally, the casing must dissolve at the proper time.

The shell casings must also be able to resist substantial physical and mechanical forces without breaking. The encapsulation must remain sufficiently intact during the pumping and circulation processes encountered in placing a material downhole so that a significant amount of material is not released into the well before the desired time. The shearing forces placed on the shells may be substantial, especially for shells encasing larger apparatuses. Shell casings derive much of their strength from being ductile and plastic. This toughness can withstand much of the rigors of the trip down the wellbore such as abrasion and the normal handling that occurs in the field.

Additionally, the protective casings must be able to survive storage, wherein capsule breakage may occur as a result of the weight of the encapsulated material stored in barrels and tanks. For this reason, it may be necessary to perform a washing treatment on the encapsulated materials when removing it from storage prior to use in well workovers or stimulation treatment.

The general shape of the encasing container is cylindrical, although any shape that will fit down a wellbore will suffice. The outside diameter of the container should be smaller than the inside diameter of the wellbore. A common size tube in a well has an inside diameter of about 2.5 inches. A suitable container would have a nominal diameter of 2 inches (1.75 inch internal diameter). The container may be any length necessary to hold the desired amount of encapsulated material with a preferred length of about 1 to about 10 feet. If the container is cylindrical, it may be cast with pipe threads at either or both ends. This would allow multiple containers to be joined together if a longer container is needed. The free ends may be sealed with a pipe cap, also containing threads, and made from the same or similar shell material.

For ease of encapsulation, spherical shaped particles are generally preferred for most encapsulation processes. By spherical it is meant substantially spherical, wherein the edges are rounded and the longest dimension is no more than about two times the shortest dimension. However, a spherical shape is not crucial for some coating processes. Furthermore, a spherical shape is stronger structurally than other shapes, and is more likely to survive unbroken in storage and in transit down a wellbore. Cylindrical shapes, on the other hand, would fall through the fluid and tend to reach the bottom of a well more quickly than other shapes.

The encapsulation process can be one of many methods well known in the art, such as spray coating, condensation, electrostatic coating, and solvent deposition. Most typically, injection molding is the preferred method of manufacture.

One method of encapsulating a bulk material within a shell is to mix the material with precursor to the casing, i.e., with the cross-linkable compound, until a uniform mixture is obtained. The mixture is then admixed with the crosslinker and solidified.

Some encapsulation methods such as spray deposition are more amenable for encapsulating larger apparatuses such as downhole tools or screens.

It is occasionally desirable to add weighing agents to the encased materials so that they can sink in a wellbore. The specific gravity of the shell can range from about 0.5 to about 2, but it is typically between 1 and 1.3. The weighing material is preferably water soluble, for example, calcium chloride, but may be of insoluble materials including granular barite which will on release simply fall into the rat-hole below the perforations. The amount of weighing agent should be sufficient to give the apparatus an overall density of greater than about 1.5 grams per cubic centimeter, preferably greater than about 2 grams per cubic centimeter.

These encased materials are particularly advantageous when a particular chemical is needed at a location downhole, that is, below the wellhead. In addition to soap, asphaltene-inhibitors, scale inhibitors, and corrosion inhibitors are particularly advantageously placed in the aqueous phase near the bottom of a well. These materials are typically needed to protect the wellbore. A series of free falling balls or cylinders can replace downhole chemical injection pumps.

Chemical diffusion through the casings is occasionally desired, for example in certain applications with materials that are needed in low concentrations, such as scale inhibitors. When diffusion is not desired, waxy inner coatings, thicker coatings, certain additives, and occasionally dissimilar crosslinked water-soluble compounds are used in laminate form with multilayer encapsulation, i.e. two or more discrete coatings, with the interface being either distinct or a gradation from one coating to another.

Similarly, it is recognized that two or more materials may be encased in a single shell, either mixed if they are compatible or separated by shell material if compatibility problems exist or if they are very reactive to each other. An example would be combining a metal compound, such as magnesium filings, with an acid, such as hydrochloric to produce an exothermic reaction generating extreme heat. This heat is useful for wax dissolution and for cleaning out wellbores.

If two reactive materials are used, each half of the sphere may be filled with the specific chemical and a flat seal can overlay the filled hemispheres. One hemisphere is then attached to the other hemisphere that is filled with the reactive chemical. Additionally, the sphere or container may be pre-partioned and filled by use of a one way valve for each specific chemical in each chamber. When the container is a right circular cylinder, the use of end plugs or flat seals may be used to carry and/or separate reactive chemicals as long as the plastic will not dissolve in that particular chemical solution. When the plastic does react to the chemical, the container must be pre-coated with a paint, wax, or other temporary coating that will be affected by downhole conditions to dissolve or allow diffusion of the chemicals that are transported to the downhole formation. One example of a coating would be to use a wax with a melt point higher than storage conditions but lower than the downhole temperature of the producing formation. The plastic itself will dissolve after time exposure to high temperature water.

The invention is also useful for workovers and the like where there are fluids in the wellbore that are incompatible with fluids that need to be placed downhole. For example, during fracturing of formations, it is sometimes advantageous to place chemicals not compatible with frac fluids, such as gel breakers, at the bottom of the well. These materials will then be freed from the encapsulating casing, and they can be pumped into the fracture without displacing a wellbore of fluid into the formation.

One particular advantage of the water-soluble shell is that it can be used to place prefabricated mechanical devices downhole. For example, a pipe that can be lowered into and retrieved from a well may be encapsulated. Then, a sand-control pack made from, for example, resin coated screens and/or resin coated proppant, can be built around the outside of the encased pipe. Manufacture of resin coated proppant is described in, for example, U.S. Pat. No. 5,955,144, the disclosure of which is incorporated herein by reference. This pipe can then be lowered into the well, and when the shell dissolves, the pipe may be easily removed from the sand-control pack and withdrawn from the well.

This sand-control pack, or screenless sand pack, may then itself be advantageously coated with a water-soluble shell. This outer coating helps protect the sand-control pack during transit down the wellbore, but is not necessary in all cases. The shell helps maintain screen and/or sand configurations until the resin sets. Such a shell is particularly desirable when there is only a screen or a resin coated screen, since such screens are often damaged during transit down a wellbore. Resins that coat proppant and screens are typically not tacky at ambient temperatures, but are best if they are not fully cured until downhole temperatures are encountered.

Additionally, when a Frac Pack or Sand Control Treatment is needed, a dissolvable liner or tube which will act as a screen for the placement of the resin coated particles may be used. After the placement is complete, the liner may dissolve. This would allow larger intervals of the wellbore to be treated and would minimize damage in and around the wellbore.

The downhole lines or tools could be dissolvable solid bars to allow a flow pathway after the treatment, or tubular cylinders with variable lengths that could be screwed together to handle various interval sizes. All of these liners can be made from a water soluble polyvinyl alcohol copolymer and a water proofing agent. These liners can also be made with multiple layers to increase strength or adjust the time available for dissolution. The liners may be used with resin coated particles that setup or bond together in and around the wellbore. When these coated particles are pumped into the formation in addition to the wellbore, production stimulation is possible along with effective formation particle control.

While many configurations are possible, an economical version is an extruded plastic tube that is slotted or drilled with holes to allow fluid flow through it. This configuration would help it dissolve in a predetermined manner. Most of the proposed materials have a predictable dissolve time based on the time exposed at a given temperature. After the treatment, hot water could be pumped slowly into the liner to hasten the dissolve time and also set up the resin coated particles into an effective downhole filter. Other uses of a dissolving pipe involve other completion and workover operations. Operations such as cementing could use the dissolving pipe as an advantage during the placement of cement plugs or patch treatments. Also, when using isolating packers between short zones the dissolving pipe or tubing could tie these together for accurate separation and then dissolve to allow easy removal of the packers at a later date. There are many other uses for pipes that dissolve. An example is in horizontal wells where a pathway is required for full production from an interval. The dissolving pipe or tube could allow a larger flow pathway and not complicate future workover operations. One of skill in the art will recognize other uses in well completion, stimulation, and workover treatments.

Wells are treated by encapsulating well or formation treatment chemicals in a water-soluble casing designed to protect the encased material for a predetermined amount of time, and then to dissolve in the aqueous phase. This encased material is placed at the desired location within the well. Preferred methods of placement include lowering encased apparatuses on a slickline or workover string. The preferred method of placement of encased materials is allowing the encased materials to fall through the fluid in the wellbore. The falling velocity may be enhanced by weights, by injecting fluids, or by altering the size and shape of the encased material. Long thick cylinders will tend to have the greatest fall velocity, but they may be damaged on collision with the wellbottom if not properly designed. Spheres fall much more slowly. The shell is designed to protect the encased material or apparatus until the material or apparatus is substantially in place in the well. Preferably, the casing is of sufficient resistance to allow a safety factor in case the materials take longer than anticipated to reach the desired location.

EXAMPLES

The following examples show the solubility of the polyvinyl alcohol copolymer in water at different temperatures. These solid spheres are obtainable under the trade name of BioBalls™ from Santrol, Fresno, Tex.

Example 1

The material composition used is a polyvinyl alcohol copolymer under the trade name of BioBalls MR™ made from the hydrolysis of polyvinyl acetate. The molecular weight is 400,000 to 800,000 daltons and there is about 88% hydrolysis of the polyvinyl acetate. The copolymer has been formed into solid spheres of diameter less than one inch. FIG. 1 shows that as the temperature is increased, the solubility of the copolymer increases. Three different temperatures are shown to illustrate the effect of each temperature on the copolymer spheres.

Example 2

Figure 2:
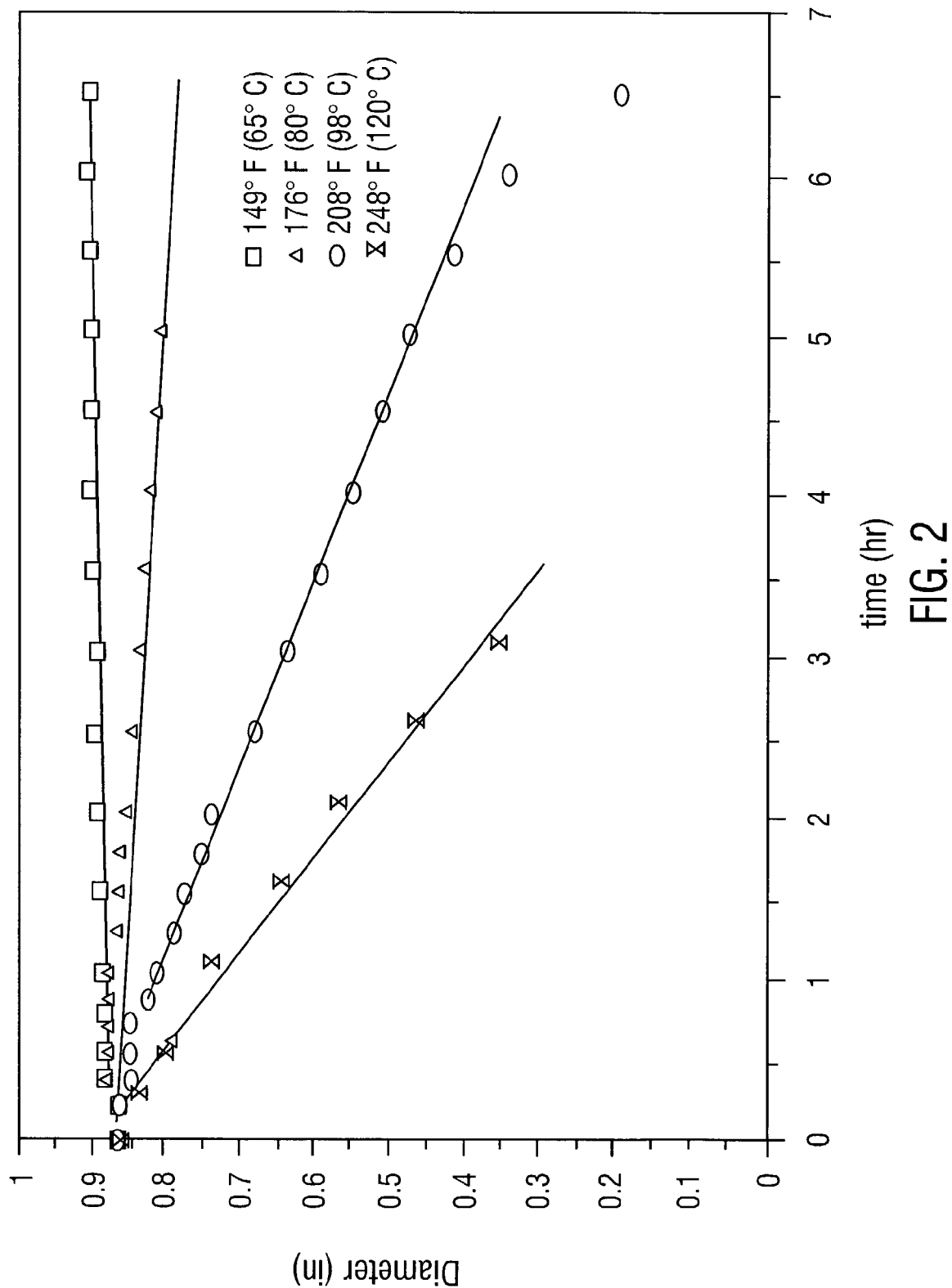
FIG. 2 is a graph of the diameter of solid polyvinyl alcohol copolymer spheres over time at various temperatures per Example 2.

The material composition is a polyvinyl alcohol copolymer under the trade name of BioBalls HR™ made from the hydrolysis of polyvinyl acetate. The molecular weight is 400,000 to 800,000 daltons and there is about 95% hydrolysis of the polyvinyl acetate. The copolymer has been formed into solid spheres of diameter less than one inch. As the temperature is increased above 80° C., the polymer begins to dissolve. One of skill in the art will appreciate that solubility of the copolymer increases only after a certain temperature is reached. FIG. 2 shows the dissolution rates at 98° C. and 120° C.

In each of the above examples the material can be used to encapsulate a chemical that is required downhole. With a hollow spherical shape the inside could be filled with the chemical. The chemical may be admixed into the copolymer and then formed into a spherical or other desirable shapes.

To protect the shell until use, a wax or other type of coating could be used to line the inside of the hollow sphere or container. This would prolong shelf life of the shell and protect it during transport. Optionally, the exterior of the sphere or container may be waterproofed. A wax or paint exterior coating would be abraded during the insertion and falling of the containers into the wellbore.

What is claimed is:

1. An apparatus for treating wells comprising:
    a) a material useful for treating wells; and
    b) a water-soluble shell substantially encasing the material in bulk, said shell comprising at least one discrete layer of a water-soluble polyvinyl alcohol co- polymer and at least one discrete layer of a waterproofing agent comprising phenoxy resin or wax or mixtures thereof.

2. The apparatus of claim 1 wherein the waterproofing agent is applied to at least a portion of the surface of the apparatus so that at least a portion thereof is rendered resistant to water to prevent premature dissolution of the article on contact with water.

3. The apparatus of claim 1 wherein the waterproofing agent further includes polyvinylacetate.

4. The apparatus of claim 1 wherein said shell further comprises a plasticizer.

5. The apparatus of claim 4 wherein the plasticizer comprises glycerol, glycerine solution, soya bean oil, or mixtures thereof.

6. The apparatus of claim 4 wherein the plasticizer is included in an amount in the range of 3 to 15% weight to weight polyvinyl alcohol.

7. The apparatus of claim 1 wherein said shell further comprises a stabilizer.

8. The apparatus of claim 7 wherein the stabilizer is stearamide.

9. The apparatus of claim 1 wherein the material useful for treating wells comprises, soap, acid, corrosion inhibitors, chelating agents, scale inhibitors, mutual solvents, paraffin inhibitors, paraffin dissolvers, clay stabilizers, tracer materials, ungelled gelatin, or mixtures thereof.

10. The apparatus of claim 1 wherein the material useful for treating wells comprises soap.

11. The apparatus of claim 1 wherein the material useful for treating wells comprises corrosion inhibitors.

12. The apparatus of claim 1 wherein the material useful for treating wells comprises a prefabricated mechanical device.

13. The apparatus of claim 12 wherein the prefabricated mechanical device is a prefabricated screen completion.

14. The apparatus of claim 12 wherein the prefabricated mechanical device is a prefabricated sand-pack, wherein said sand-pack includes resin coated screens, resin coated proppant, or both.

15. The apparatus of claim 12 wherein the prefabricated sand-pack is built around the outside of an encased pipe, wherein said pipe has a connector to attached near the upward end, and wherein said pipe has a dissolvable shell between the pipe and the sand- pack.

16. The apparatus of claim 1 wherein the shell is between about 1 to about 25 millimeters in thickness.

17. The apparatus of claim 1 further comprising multi-layer encapsulation.

18. The apparatus of claim 1 further comprising a wax layer between the material and the shell.

19. The apparatus of claim 1 further comprising a wax layer, wherein said wax layer substantially encases the shell, and wherein said wax layer will melt at the temperature below that temperature of the well at which the encased material is intended to be released.

20. The apparatus of claim 1 wherein the material is a scale inhibitor.

21. The apparatus of claim 20 wherein the scale inhibitor is dispersed throughout the shell.

22. The apparatus of claim 21 wherein the scale inhibitor is encased in a plurality of cavities within the shell, wherein the cavities are less than about 0.5 inches in diameter.

23. The apparatus of claim 1 further comprising a weighing agent, wherein the quantity of the weighing agent is sufficient to give the apparatus an overall density of greater than about 1.5 grams per cubic centimeter.

24. The apparatus of claim 1 further comprising a weighing agent, wherein the quantity of the weighing agent is sufficient to give the apparatus an overall density of greater than about 2 grams per cubic centimeter.

25. The apparatus of claim 1 wherein the water-soluble shell separates at least two highly reactive materials which may react upon dissolution of said water-soluble shell downhole.

26. The apparatus of claim 25 wherein one of the materials is magnesium metal filings and the other is hydrochloric acid.

27. A method of treating a well comprising:
a) substantially encasing, in bulk, material useful for treating wells in a water soluble shell, wherein said shell comprises a water-soluble polyvinyl alcohol co-polymer and a waterproofing agent comprising phenoxy resin or wax or mixtures thereof
b) inserting the substantially encased material into the well;
c) transporting said encased material to the desired depth in the well; and
d) leaving the material at the desired depth for a time sufficient for the water-soluble shell to dissolve, thereby exposing the material to fluids in the well.

28. The method of claim 27 wherein said time sufficient for the water-soluble shell to dissolve ranges from about 0.5 hours to about 2 weeks.

29. The method of claim 27 wherein the water-soluble shell separates at least two highly reactive materials which may react upon dissolution of said water-soluble shell downhole.

30. The method of claim 29 wherein one of the materials is magnesium metal filings and the other is hydrochloric acid.

31. An apparatus for delivery of well treating materials comprising:
a water-soluble shell comprising at least one discrete layer of a water-soluble polyvinyl alcohol co-polymer and at least one discrete layer of a waterproofing agent comprising phenoxy resin or wax or mixtures thereof, wherein the shell has the shape of a substantially cylindrical pipe with two ends.

32. The apparatus of claim 31 wherein said pipe comprises pipe threads at each end.

33. The apparatus of claim 32 wherein the ends are sealed using pipe caps.

34. The apparatus of claim 32 wherein two pipes are joined together using said pipe threads.

35. An apparatus useful for sand control treatment comprising:
a water-soluble shell having the shape of a substantially cylindrical pipe having two ends, said shell comprising at least one discrete layer of a water-soluble polyvinyl alcohol and at least one discrete layer of a waterproofing agent comprising phenoxy resin or wax or mixtures thereof.

36. The apparatus of claim 1 wherein the shell is in the form of a flexible liner or tube.

37. The apparatus of claim 1 wherein the inner layer of the shell comprises the waterproofing agent.

38. The apparatus of claim 1 wherein the outer layer of the shell comprises the waterproofing agent.

39. The method of claim 27 wherein the shell comprises at least one discrete layer of the water soluble polyvinyl alcohol co-polymer and at least one discrete layer of the waterproofing agent.

40. The method of claim 39 wherein the inner layer of the shell comprises the waterproofing agent.

41. The method of claim 40 wherein the outer layer of the shell comprises the waterproofing agent.

42. The apparatus of claim 1 wherein the shell is in the form of a substantially cylindrical pipe having two ends.

43. The apparatus of claim 1 wherein the interface between the layers of polyvinyl alcohol co-polymer and waterproofing agent is distinct or a gradation between the two layers.

44. The apparatus of claim 31 wherein the interface between the layers of polyvinyl alcohol co-polymer and waterproofing agent is distinct or a gradation between the two layers.

45. The apparatus of claim 35 wherein the interface between the layers of polyvinyl alcohol co-polymer and waterproofing agent is distinct or a gradation between the two layers.

* * * * *